Nov. 5, 1963 T. H. GEBALLE 3,109,963

INSULATED SUPERCONDUCTING WIRE

Filed Aug. 29, 1960

INVENTOR
T. H. GEBALLE
BY George S. Indig
ATTORNEY

United States Patent Office 3,109,963
Patented Nov. 5, 1963

3,109,963

INSULATED SUPERCONDUCTING WIRE

Theodore H. Geballe, Summit, N.J., assignor to Bell Telephone Laboratories, Incorporated, New York, N.Y., a corporation of New York Filed Aug. 29, 1960, Ser. No. 52,409
4 Claims. (Cl. 317—123)

Figure 1:
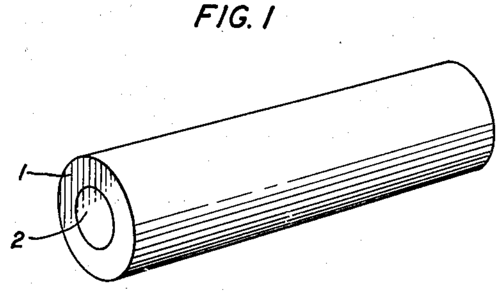

This invention relates to a process for insulating superconducting wires, to wires so insulated and to devices utilizing such wires.

Attention in the art has recently been directed to the production of magnetic fields by means of superconducting solenoids consisting of one or more coils of a superconducting wire material. Since, desirably, such superconducting materials must exhibit fairly large critical fields in order to be of value in solenoid devices and, further, since such materials must be sufficiently ductile to permit their being drawn to a wire configuration, the art to date is relatively limited as to the number of materials fulfilling these requirements. In general, molybdenum-rhenium and bismuth-lead alloys are the most popular materials currently used as superconducting coils. These alloys exhibit critical fields in the order of 15.5 kilogauss and 18 kilogauss, respectively, and critical temperatures of 2 degrees Kelvin and 8 degrees Kelvin, respectively. These materials are sufficiently ductile to permit their being drawn to fine wires having a diameter of the order of 1 mil or less.

Superconducting coils formed of these materials are suspended in a liquid nitrogen or helium bath which reduces the temperature of the coils to lower than the critical temperature of the material utilized. Once a magnetic field is established within such a coil, no further power is required to sustain the field provided that the critical temperature or critical field of the coil material is not exceeded. Cryogenic equipment and techniques are now developed to a point where superconducting solenoids capable of producing fields of about 10 to 15 kilogauss and higher are economically competitive with the more conventional solenoids.

The field strength exhibited by a superconducting solenoid is dependent on the number of coils times the number of windings per coil times the amperes through the coil. To date, efforts in the art to increase the field strength have been directed to developing new superconducting materials exhibiting higher critical fields. Such higher critical fields permit a larger current to be utilized in the coils, which in turn permits the attainment of a higher field strength for the solenoid.

In view of the previously set forth formula, it is apparent that field strength can be increased by increasing the number of windings per coil. However, the length of each coil is determined by the space requirements in the environment in which the solenoid is to be utilized. Since each winding must be insulated to prevent short-circuiting, it is apparent that in a given unit length of coil much of the length is taken up by the insulating coating, thereby minimizing the number of windings that can be utilized to achieve the total field strength. Exemplary of the insulating materials utilized on superconducting windings are the organic plastic materials, such as rubber and Mylar. Such coatings typically are 0.5 mil thick when formed on a 1-mil wire. This wire is, in general, the minimum diameter obtainable by today's cold-rolling processes.

Since it is mandatory that the windings be insulated to prevent short-circuiting, there is also the danger that the coil will melt or the insulation burn in the event that the superconductor reverts to its normal state. Superconductivity is destroyed when the critical field of coil material or the critical temperature of the coil material is exceeded. In the normal state, the current flowing through the coil is dissipated by conversion to heat. The heat on occasion may be sufficient to destroy the coil.

In accordance with applicant's invention, it has been discovered that a particular process can be utilized to insulate the windings of superconducting coils which permits more coils per unit length of coil to be used than heretofore possible. This process further minimizes the danger that the coil might be overloaded if it should return to its normal resistive state during operation.

In particular, this process contemplates cold-reducing the diameter of a superconducting wire to a point where subsequent cold-drawing can be utilized to achieve the minimum desired diameter. Prior to the final cold-drawing step, the wire is coated with silver, gold or copper. The subsequent cold-drawing step therefore reduces the diameter of the wire and also the thickness of the insulating coating.

Unlike conventional insulating materials heretofore utilized by the art, this process utilizes materials that are good conductors. These materials, however, in comparison to superconducting materials which exhibit no resistance, act as an insulating coating. In contrast to the prior art organic insulators, these metals are readily malleable and easily cold-worked. As a result, it is feasible to depart from prior art processes and form the insulating coating on the superconducting wire before the final cold-drawing step. Since the organic insulators are not malleable, they must be applied to the wire subsequent to the final cold-drawing step. The advantage to being able to form an insulating coating on the wire before the final cold-drawing step is readily apparent. Such subsequent drawing both reduces the diameter of the wire and also the thickness of the coating to a value heretofore not attainable by the prior art processes. For example, 1-mil wire is typically insulated with a 0.5 mil thick coating of the organic insulators. By the instant process, however, the formed wire may have as little as a 0.05 mil thick insulating coating. This significant decrease in insulation thickness permits many more windings to be utilized in a unit length of the solenoid, with an accompanying increase in the magnetic field exhibited by the solenoid.

Furthermore, the gold, silver or copper insulating coating is a better conductor than the superconducting materials in their normal state. Accordingly, if such materials should revert to their normal state during operation, the current will automatically be shunted through the path of least resistance, which is the metal insulation. This protects the coils from destruction due to inadvertent overloading, whether due to exceeding critical field or temperature.

Figure 2:
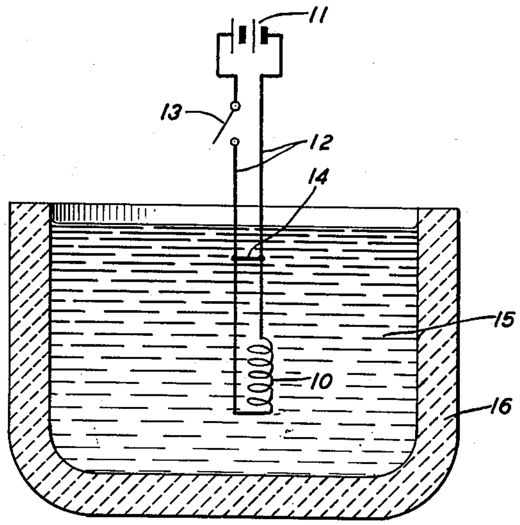

A more complete understanding of the invention may be gained from reference to the following drawing in which:

FIG. 1 is a perspective view of a section of wire treated in accordance with the present invention; and FIG. 2 is a front elevational view of a superconducting magnet and is illustrative of one embodiment of the invention wherein the wire depicted in FIG. 1 is utilized.

Referring again to FIG. 1, there is shown a superconducting wire 2 insulated with a material 1 of the present invention. Any superconducting material such as molybdenum-rhenium and bismuth-lead may be insulated with gold, silver or copper in accordance with the invention.

FIG. 2 depicts a superconducting magnet utilizing a coil 10 formed from the wire shown in FIG. 1. Coil 10 is connected to an external power source such as battery 11 by means of superconducting leads 12 and switch 13. Leads 12 are connected by shunt 14 formed of a superconducting material. Coil 10 and shunt 14 are suspended in a low temperature environment 15, such as liquid helium or liquid nitrogen, which makes coil 10, shunt 14 and that section of leads 12 connecting the coil and the shunt superconducting. Typically, the liquid helium or liquid nitrogen is contained in Dewar flask 16.

Superconducting wires as generally made have diameters sufficiently large to seriously impair their usefulness as superconducting coils. For example, molybdenum-rhenium wires prepared by passing a molten zone along a bundle of molybdenum and rhenium rods by zone-refining, as described by E. Buehler, Transactions of the American Institute of Mechanical Engineers 212,694 (1958), typically exhibit a diameter of 0.5 centimeter. Such large diameter wire would naturally restrict the number of windings that could be utilized per unit length of coil, thereby decreasing the field strength achieved by a coil. Accordingly, the wires must be further processed to obtain the minimum diameter possible. Conventionally, the wires are first cold-reduced to a diameter which lends itself to cold-drawing techniques. Depending on the superconducting material utilized, such cold-reduction can take various forms well known to the art, for example, cold-rolling, swaging and cold extrusion.

For molybdenum-rhenium wire, the cold reduction consists of a series of steps which alternatively physically reduce the diameter of the wire as, for example, by cold-rolling or swaging and then annealing the wire. Experience has indicated that the wire can undergo a diameter reduction of 30–65 percent for each cold-rolling or swaging step. Reductions greater than 65 percent increase the hardness of the wire to an extent that it becomes nonductile and resists deformation in a subsequent reduction step. Each reduction step is followed by an anneal sufficient to recrystallize the material into smaller grains, thereby causing it to become sufficiently soft for the subsequent cold-rolling or swaging step. A wide range of temperatures and firing times can be satisfactorily used in this annealing step. The minimum temperature and time is that which causes recrystallization. The maximum temperature and time is that at which the crystals commence growing again, thereby causing the body to become hard. Such growth can be detected microscopically. For molybdenum-rhenium, an anneal of 1600 degrees centigrade to 1700 degrees centigrade for 10 to 30 minutes has been found to be satisfactory. The anneal is conducted in a protective atmosphere to prevent the formation of volatile oxides which destroy the stoichiometry of the wire. Inert gasses, such as argon, helium and nitrogen, have been found to give adequate protection.

The cold-rolling or swaging and annealing steps are continued until the diameter of the wire is sufficiently small so that it can be cold-drawn. The above-described cold-reduction step, in addition to reducing the diameter of the wire, also causes the wire to become sufficiently ductile to lend itself to cold-drawing. In the case of molybdenum-rhenium, and in general, a reduction in diameter to 1/16 to 1/8 inch has been found to be satisfactory to permit subsequent cold-drawing. After the final cold-rolling or swaging step, the molybdenum-rhenium wire is subjected to a final anneal before subsequent cold-drawing.

In the case of the malleable bismuth-lead wire, the cold-reduction step readily lends itself to a cold extrusion process wherein the bismuth-lead wire is cold-extruded to approximately 10 mils. This size lends itself to subsequent cold-rolling.

After cold-reduction, the wire is then cold-drawn to achieve its final diameter. This step is necessary since the cold-reduction processes are not capable of forming the small diameter wires contemplated for use as solenoid coils. In general, all cold-drawing processes are the same, in that the wire is physically drawn in a series of steps to a small diameter. Due to the limitation of machinery available for such cold-drawing, the wire cannot initially be drawn from its initial to its final diameter dispensing with the cold-reduction step. Further, machinery available for such cold-drawing dictates that such drawing must be in an increment of several steps, each step reducing the diameter until the final diameter is achieved. Any time after the first cold-drawing step, the wire is coated with gold, silver or copper. Such coating is of sufficient thickness such that after subsequent cold-drawing steps the wire is coated with a continuous layer of one of these metals. Experience has shown that when the length of the wire, and therefore the metal coating, is increased by a factor of 4, the diameter of the wire and the thickness of the coating is decreased by one-half. Accordingly, it is within the skill of the art to determine the thickness of the metal coating initially put on the wire. In general, it has been determined that a 6 percent by weight layer of gold, copper or silver applied to a wire having a diameter of 0.08 inch or less exhibits a continuous coating after the wire has been drawn to a 1-mil diameter. The effectiveness of the metal coating can readily be determined by visual examination during the various stages of the cold-drawing and after the final cold-drawing step to determine if the layer is too thick, so as to become brittle, or too thin, so as to result in a noncontinuous layer.

The wire can be most expeditiously coated with the metal by conventional electroplating techniques. In accordance with these techniques, the wire is made cathodic in a plating solution containing the desired cation. Preferably, an inert anode such as platinum is utilized, although if agitation means are provided an anode formed of the desired metal can be used. The conventional cyanide electroplating baths, among others known to the art, containing the desired metal are used. The art is aware of suitable concentration and plating conditions, for example, as set forth in the yearly publication Metal Finishing Guide Book, published by Metal and Plastics Publications, Incorporated.

After the final cold-drawing step, the wire is then wound into a coil by conventional techniques and is then ready to be utilized as a superconducting solenoid.

A specific example of one process in accordance with this invention used in the preparation of an insulated superconducting coil is as follows:

A 0.210 inch diameter molybdenum-rhenium wire underwent seven successive swaging and annealing steps to form a 0.058 inch diameter wire. Annealing was carried out at a temperature of 1650 degrees centigrade for thirty minutes in hydrogen. After annealing, the wire was cooled to room temperature and then swaged again. After the seventh and final annealing, the wire was then cold-drawn in a series of six steps, each step reducing the diameter by 0.004 inch. The diameter at the end of the sixth cold-drawing step was 0.034 inch. The wire was then cold-drawn in a series of 0.002 inch reduction steps to attain a diameter of 0.02 inch. Subsequently, the wire was subjected to ten 1-mil reduction steps, resulting in a diameter of 0.010 inch. Next, the diameter was reduced to 0.006 inch by successive one-half mil reduction steps. The diameter was then reduced from 0.006 to 0.005 inch in a series of one-quarter mil reduction steps. At this stage, the wire was then gold plated in an electro-plating bath containing 1½ grams of gold per liter, 8 grams of potassium cyanide per liter and 15 grams of potassium carbonate per liter. The plating bath temperature was approximately 1250 degrees Fahrenheit and the current density was approximately 7 amperes per square foot. Plating was continued until an amount of gold equal to 8 percent by weight of the total weight of the wire and gold was deposited on the wire. After gold plating, the diameter of the wire was cold-drawn from 0.005 inch to 0.001 inch in a series of one-quarter mil reduction steps. The resulting 0.001 inch molybdenum-rhenium wire was coated with a continuous layer of gold approximately 0.05 mil thick.

The insulated wire was then incorporated in a superconducting magnet configuration utilizing 30,000 turns of the wire. A current of one ampere in the coil resulted in a magnetic field of 15.5 kilogauss. The specific configuration is disclosed in copending patent application Serial No. 56,748, filed September 19, 1960, by J. E. Kunzler.

Of necessity, the invention is described in a limited number of embodiments. Alternative embodiments readily apparent to those skilled in the art are intended to be within the scope of the appended claims. For example, although in the embodiment described in the example molybdenum-rhenium wire is coated with gold, any superconducting material having the requisite physical properties may be gold, silver or copper coated.

What is claimed is:

1. A system comprising a superconducting wire coated with a metal selected from the group consisting of silver, gold, and copper, together with a low-temperature environment to reduce the temperature of said wire to a temperature below its critical temperature, said metal at the reduced temperature acting as an insulating material in comparison to the superconducting wire.

2. A system in accordance with claim 1 wherein said superconducting wire consists essentially of an alloy of molybdenum and rhenium.

3. A system in accordance with claim 1 wherein the superconducting wire consists essentially of an alloy of bismuth and lead.

4. A system as defined in claim 1 wherein the superconducting wire is formed into a coil configuration forming a magnet, leads connecting said coil with a power source, and a superconducting member shunting the said coil configuration.

References Cited in the file of this patent

UNITED STATES PATENTS

| | | |
|---|---|---|
| 2,118,758 | Crapo | May 24, 1938 |
| 2,268,617 | Pierce | Jan. 6, 1942 |
| 2,958,836 | McMahon | Nov. 1, 1960 |
| 2,962,681 | Lentz | Nov. 29, 1960 |

OTHER REFERENCES

Autler: Superconducting Electromagnets, "Review of Scientific Instruments," Vol. 31, No. 4, April 1960; pp. 369–373.